(12) United States Patent
Timsina et al.

(10) Patent No.: US 11,588,241 B2
(45) Date of Patent: Feb. 21, 2023

(54) COMPACT SWITCHED LINE PHASE SHIFTER FOR A MICROSTRIP PHASED ARRAY ANTENNA

(71) Applicant: University of New Hampshire, Durham, NH (US)

(72) Inventors: Rudra Timsina, Concord, NH (US); Richard Messner, Newfields, NH (US)

(73) Assignee: UNIVERSITY OF NEW HAMPSHIRE, Durham, NH (US)

( * ) Notice: Subject to any disclaimer, the term of this patent is extended or adjusted under 35 U.S.C. 154(b) by 37 days.

(21) Appl. No.: 17/155,074

(22) Filed: Jan. 21, 2021

(65) Prior Publication Data

US 2021/0143545 A1     May 13, 2021

Related U.S. Application Data

(63) Continuation of application No. 16/194,866, filed on Nov. 19, 2018, now Pat. No. 10,923,815.

(60) Provisional application No. 62/587,793, filed on Nov. 17, 2017.

(51) Int. Cl.
| | |
|---|---|
| *H01Q 3/38* | (2006.01) |
| *H01Q 21/00* | (2006.01) |
| *H01Q 3/36* | (2006.01) |
| *G01S 7/282* | (2006.01) |

(52) U.S. Cl.
CPC .............. *H01Q 3/38* (2013.01); *H01Q 3/36* (2013.01); *H01Q 21/0075* (2013.01); *G01S 7/282* (2013.01)

(58) Field of Classification Search
CPC .......... H01Q 3/38; H01Q 3/36; H01Q 21/065; H01Q 21/0075

USPC ............................................................ 342/372
See application file for complete search history.

(56) References Cited

U.S. PATENT DOCUMENTS 7,808,427 B1 *  10/2010  Sarcione ................. H01Q 3/26
                                                                 342/368

FOREIGN PATENT DOCUMENTS

| CA | 2270302 A1 * | 10/2000 | ............... H01Q 1/38 |
|---|---|---|---|
| CN | 104078769 A  * | 10/2014 | |
| JP | 2011044774 A * | 3/2011 | |
| WO | WO-2017145968 A1 * | 8/2017 | .............. H01P 5/227 |

* cited by examiner

*Primary Examiner* — Harry K Liu
(74) *Attorney, Agent, or Firm* — Grossman, Tucker, Perreault & Pfleger, PLLC

(57) ABSTRACT

This disclosure is generally directed to a microstrip phased array antenna with a switch line phase shifter to obtain steerable beam pattern. In an embodiment, the microstrip phased array antenna includes a plurality microstrip lines disposed/patterned on a substrate to form a relatively compact phase shifter network that can switchably introduce phase shifts into an RF signal. In particular, each phase shifter of the phase shifter network may be formed from a number of equal-length RF lines that extend from a common point and "loop" to form substantially circular paths. The common point from which each of the RF lines extend may include a VIA to couple to an antenna device. A plurality of switches, e.g., PIN diodes, may be disposed along the RF lines to switchably extend the overall length of each of the phase shifters, and more particularly each transmission line, to selectively introduce a target phase shift.

20 Claims, 5 Drawing Sheets

COMPACT SWITCHED LINE PHASE SHIFTER FOR A MICROSTRIP PHASED ARRAY ANTENNA

CROSS-REFERENCE TO RELATED APPLICATIONS

The present application is a continuation of co-pending U.S. Application Ser. No. 16/194,866 titled "A Compact Switched Line Phase Shifter for a Microstrip Phased Array Antenna" filed on Nov. 19, 2018, which claims the benefit of U.S. Provisional Patent Application Ser. No. 62/587,793 filed Nov. 17, 2017, each of which is fully incorporated herein by reference.

TECHNICAL FIELD

The present disclosure relates to phased array antennas, and more particularly, to a compact switched line phase shifter for a microstrip phased array antenna.

BACKGROUND

Phased array antennas (PAAs) are widely used for various applications requiring fixed or steerable beam pattern. These antennas provide control over the direction and beam pattern without mechanically adjusting the antenna position. The beam produced by the antenna can be steered in a desired angle by changing the phase of individual antenna element. The PAA provides flexibility to receive signal from a direction where the signal path is not obstructed and transmit signal in any preferred direction.

A switch line phase shifter is one type of microstrip line phase shifter that provides phase shifts by switching between various microstrip lines. A Butler Matrix is another kind of microstrip line phase shifter. However, existing phase shifters consume a significant amount of substrate/chip space and cannot be implemented under/immediately adjacent each antenna element in a phased antenna array due to limited space between antenna elements. Moreover, single pole multiple throw switches are required to integrate the phase shifter in such designs.

BRIEF DESCRIPTION OF THE DRAWINGS

Reference should be made to the following detailed description which should be read in conjunction with the following figures, wherein like numerals represent like parts.

DETAILED DESCRIPTION

This disclosure is generally directed to a microstrip phased array antenna with a switch line phase shifter to obtain steerable beam pattern. In an embodiment, the microstrip phased array antenna includes a plurality microstrip lines (or RF lines) disposed/patterned on a substrate to form a relatively compact phase shifter network that can switchably introduce phase shifts into an RF signal to be transmitted by an antenna element. In particular, each phase shifter of the phase shifter network may be formed from a number of equal-length RF lines that extend from a common point and "loop" to form substantially circular paths. The RF lines may also be referred to as microstrip line segments, RF line segments, or transmission lines. The common point from which each of the RF lines extend may include a VIA (or other interconnect device) to couple to an antenna device. A plurality of switches, e.g., PIN diodes, may be disposed along the RF lines to switchably extend the overall length of each of the phase shifters, and more particularly each transmission line, to selectively introduce a target phase shift of, for instance 0, 90, 180, or 270 degrees. The VIA may couple each phase shifter to an antenna device either directly, or by way of an intermediate device such as a coaxial cable.

In an embodiment, the microstrip phased array antenna arrangmenet comprises a 1×4 array, and may have a maximum steering angle between −45° to +45°. Note, the microstrip phased array antenna arrangement is not limited to a 1×4 array and may comprise different configurations, e.g., 1×8, 2×4, 8×12, M×N, etc. The microstrip phased array antenna arrangmenet may be particularly well suited for WiFi applications, Multiple Input Multiple Output (MIMO) communications, scanning radars, and other applications that utilize steerable beam patterns.

The microstrip phased array antenna arrangement of the present disclosure advantageously reduce the chip space needed to implement each phase shifter, which may be particularly advantageous when the phase shifter network is integrated with an antenna in a relatively tight space.

Figure 1:
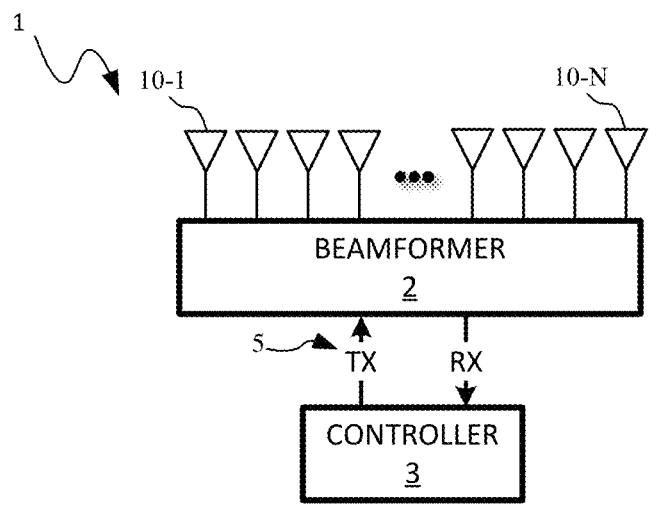
FIG. 1 is a block diagram of one exemplary embodiment of a system consistent with the present disclosure.

Turning to the Figures, FIG. 1 shows a phased array antenna system 1 in accordance with an embodiment of the present disclosure. As shown, the system 1 includes a controller 3, a beamformer 2, and a plurality of antenna devices 10-1 to 10-N. The controller 3 may comprise, for instance, an application-specific integrated circuit (ASIC), field programmable gate array (FPGA) or other suitable controller. The controller 3 and the beamformer 2 may be formed on the same substrate, or different substrates, depending on a desired configuration.

The beamformer 2 may comprise a compact phase shifter network capable of performing beam steering through selective introduction of phase shifts into an output RF signal, which is discussed in greater detail below. The beamformer 2 may comprise one or more substrates formed from a dielectric material.

The antenna devices (or elements) 10-1 to 10-N may comprise any suitable antenna device for transmission of RF. Although examples discussed herein reference four (4) antenna devices, this disclosure is not limited in this regard. The particular antenna elements may be selected based on a desired application. Note, RF transmission lines may be matched to 50 ohms for 4.9 to 5.1 GHz applications. For other applications, the transmission lines may be configured to match to 50 ohms impedance at the desired frequency band. Each antenna device 10-1 to 10-N may couple to the phase shifter network of the beamformer 2 via a SubMiniature Version A (SMA) connector or other suitable connector device.

In operation, the controller 3 provides a driving signal 5 to the beamformer 2. In response, the beamformer 2 may utilize the phase shifter network to output RF in a particular direction, e.g., +−45 degrees. The phased array antenna system 1 may be configured to output at a frequency of 4.9 GHZ to 5.1 GHZ, although other bandwidths are within the scope of this disclosure.

Figure 2:
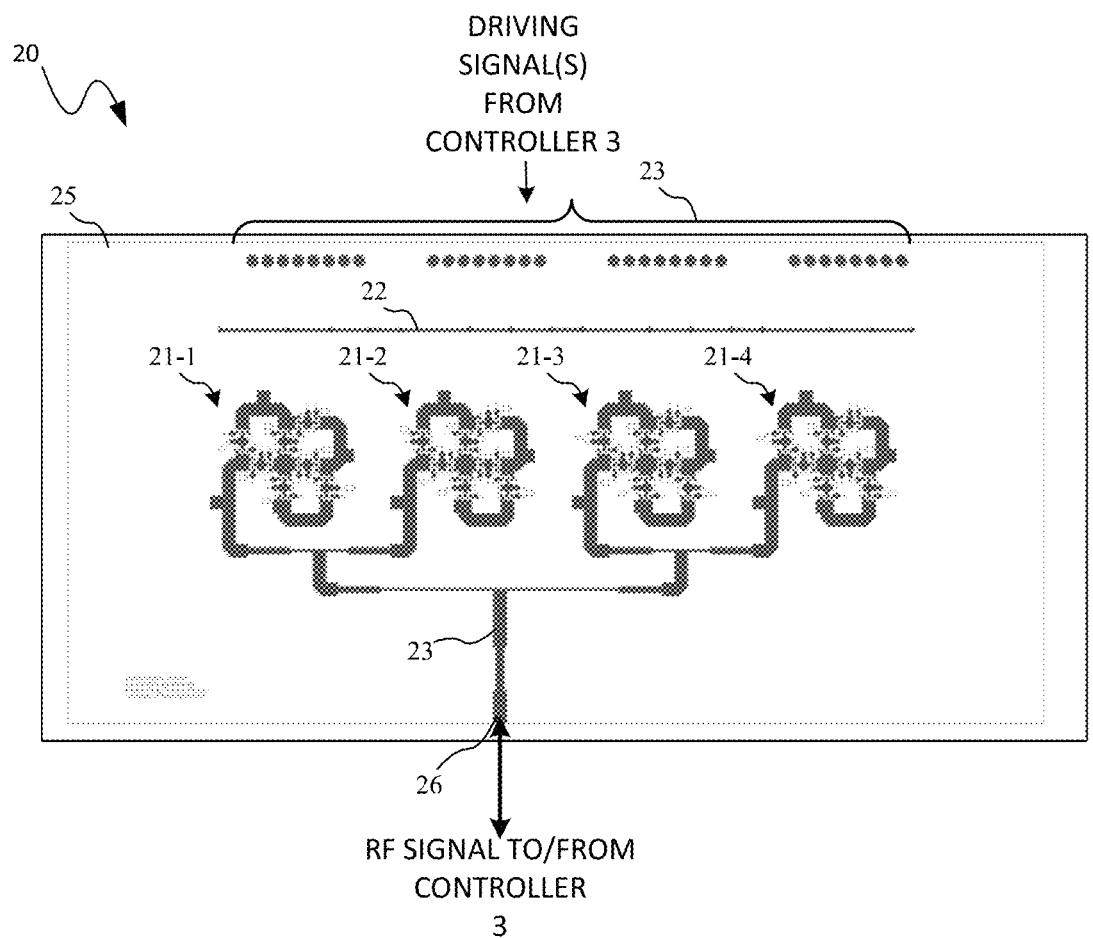
FIG. 2 is an example schematic of a phase shifter circuit consistent with an embodiment of the present disclosure.

FIG. 2 illustrates an example phase shifter circuit 20 suitable for use within the beamformer 2 of FIG. 1. As shown, the phase shifter circuit 20 includes a corporate feed network 23 disposed on a substrate 25. The corporate feed network 23 includes an input/output (IO) terminal 26 to communicate with the controller 3. Note, in some embodiments the corporate feed network 23 may be transmit only, or receive only, depending on a desired configuration. To this end, the example embodiment of FIG. 2 should not be construed as limited in this regard.

The corporate feed network 23 is formed from a common control line that branches out into four (4) distinct phase shifters, namely phase shifters 21-1 to 21-4. Each of the plurality of phase shifters 21-1 to 21-4 may be formed via microstrip lines or other suitable electrical traces. The time of flight for RF signals introduced into the phase shifters 21-1 to 21-4 may be varied relative to the overall length of each of the phase shifter paths (or phase shifter transmission lines). Switches, e.g., switches 30-1 to 30-7 (FIG. 3), may be disposed between microstrip line segments to vary the overall length of each phase shifter to achieve a desired delay based on time of flight, and thus, introduce a selected phase shift into the output RF signal.

As further shown, the example phase shifter circuit 20 includes trace 22 to electrically couple the ground of each of the switches 34-1 to 34-7 to the controller 3 to receive driving signals from the same. Likewise, each of the switches 34-1 to 34-7 (FIG. 3) electrically couple to the controller 3 through terminals 23.

Figure 3:
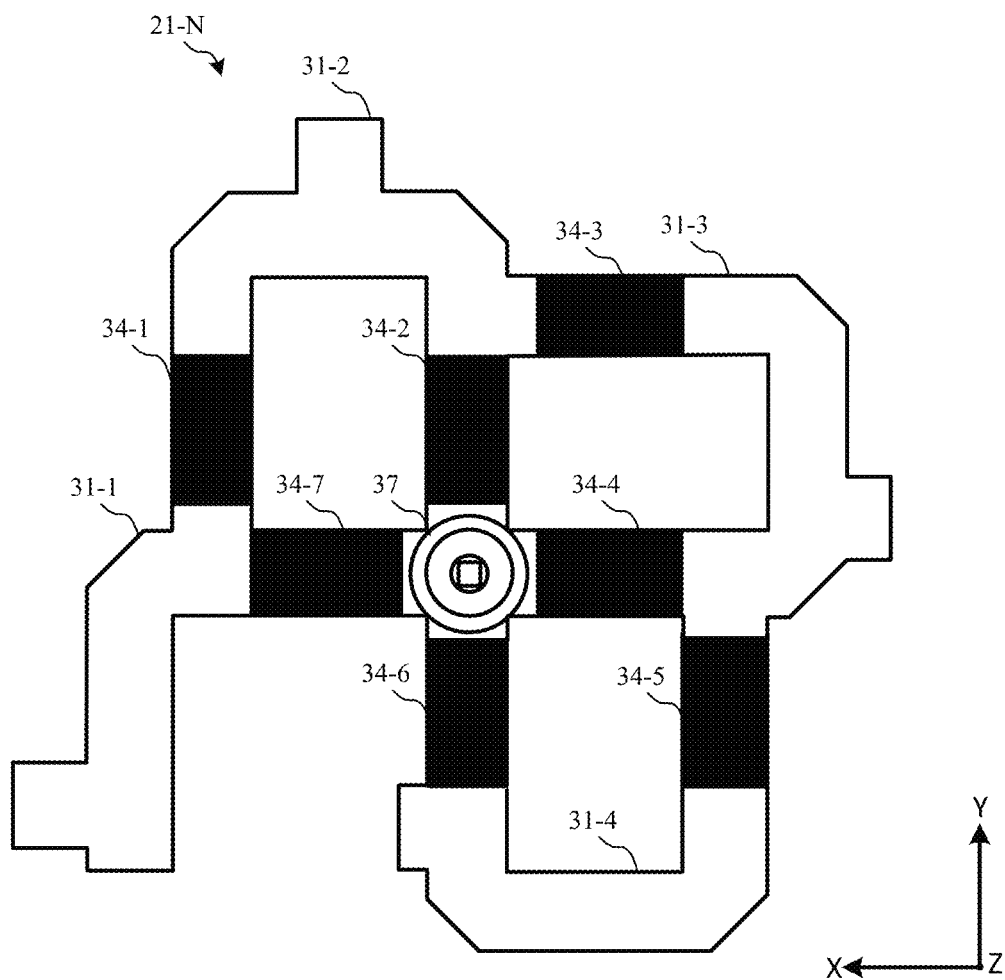
FIG. 3 shows an example phase shifter for use in the phase shifter circuit of FIG. 2, in accordance with an embodiment of the present disclosure.

FIG. 3 shows one example phase shifter 21-N in isolation, in accordance with an embodiment of the present disclosure. As shown, the phase shifter 21-N includes a plurality of microstrip line segments 31-1 to 31-4, a plurality of switching devices 34-1 to 34-7 (which may also be referred to as a switching arrangement), and an interconnect 37 (which may also be referred to as an antenna element interconnect). Each of the microstrip line segments 31-1 to 31-4 may be of equal length, and thus, introduce an equal amount of phase shift when activated by associated switching devices. Note, however, microstrip lines may vary in length due to manufacturing variations and other real-world factors. To this end, each microstrip line segment may be substantially equal in length within a tolerance of, for instance, 1-5%.

Figure 7A:
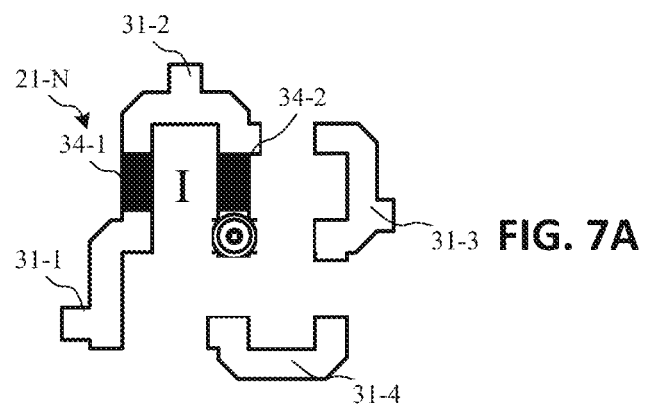
FIG. 7A shows the example phase shifter of FIG. 3 with a plurality of switches switched ON to introduce a phase shift of substantially 90 degrees into an output RF signal, in accordance with an embodiment of the present disclosure.
Figure 7B:
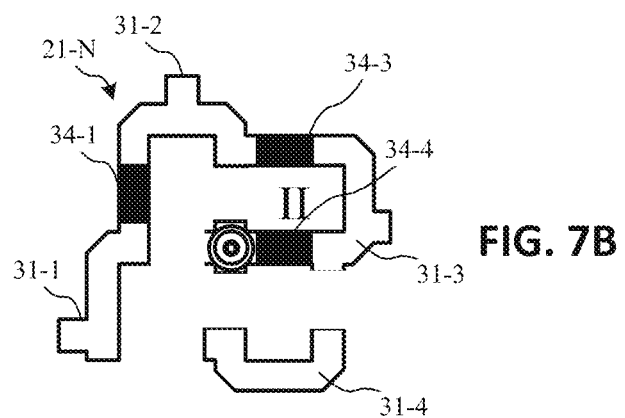
FIG. 7B shows the example phase shifter of FIG. 3 with a plurality of switches switched ON to introduce a phase shift of substantially 180 degrees into an output RF signal, in accordance with an embodiment of the present disclosure.
Figure 7C:
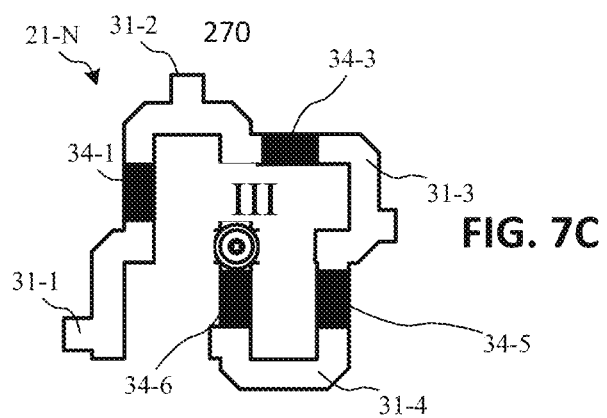
FIG. 7C shows the example phase shifter of FIG. 3 with a plurality of switches switched ON to introduce a phase shift of substantially 270 degrees into an output RF signal, in accordance with an embodiment of the present disclosure.
Figure 7D:
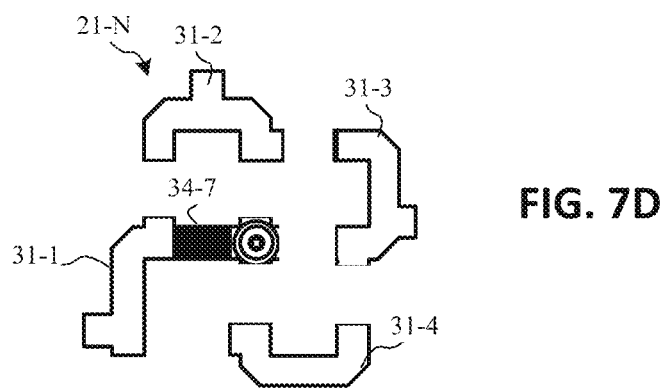
FIG. 7D shows the example phase shifter of FIG. 3 configured to introduce a phase shift of substantially 0 degrees into an output RF signal.

Microstrip line segment 31-1 and switch 34-7 may form a reference arm, which is to say a transmission line that introduces a zero-degree phase shift (See FIG. 7D). Microstrip line segment 31-2 can be switchably engaged via switches 34-1 and 34-2 to introduce a 90 degree phase shift (See FIG. 7A). Microstrip line segments 31-2 and 31-3 may be switchably engaged via switches 34-1, 34-3 and 34-4 to introduce a 180 degree phase shift (FIG. 7B). Microstrip line segments 31-2, 31-3 and 31-4 may be switchably engaged via switches 34-1, 34-3, 34-4, 34-5 and 34-6 to introduce a 270 degree phase shift (FIG. 7C). Each of these switching modes will be discussed in further detail below.

Figure 4:
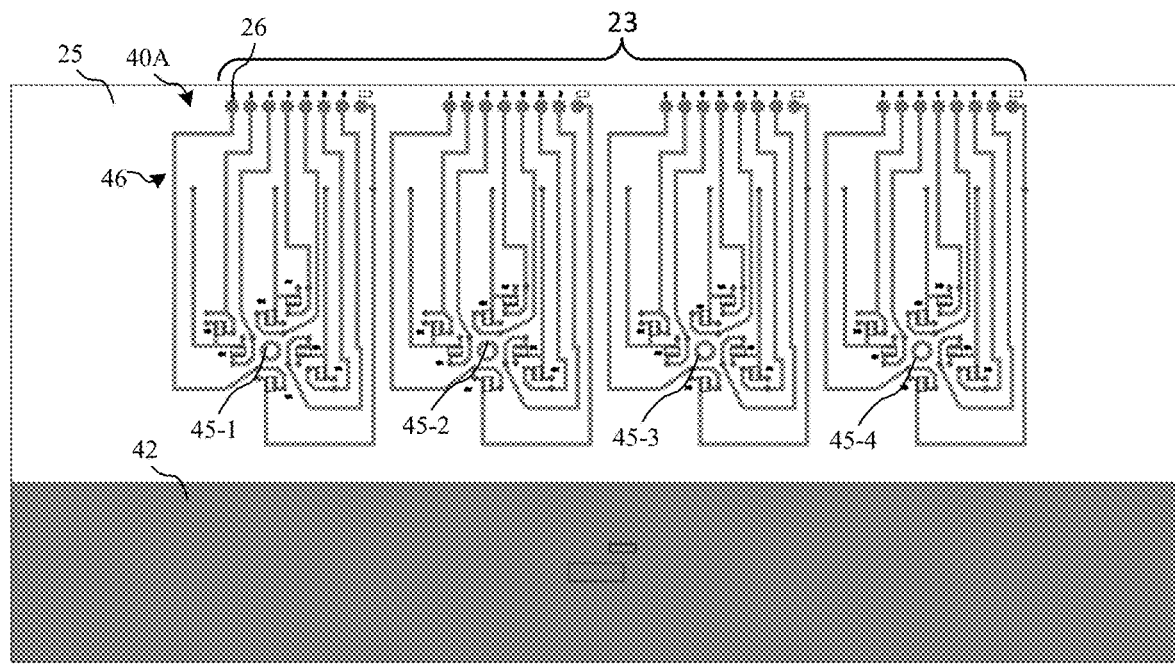
FIG. 4 shows an example driver circuit for the phase shifter circuit of FIG. 2, in accordance with an embodiment of the present disclosure.

FIG. 4 shows a switch driving circuit 40A disposed/formed on a side of the substrate 25 opposite of the phase shifts 21-1 to 21-4. The switch driving circuit 40A electrically couples to each of the switches of the phase shifters 21-1 to 21-4 via plurality of control lines 46. The example driving circuit 40A further includes a plurality of VIAs 45-1 to 45-4 (or other suitable interconnect device) that extend through the substrate 25 and electrically couple to an associated phase shifter disposed on the opposite side of the substrate 25. The example driving circuit 40A may further include an antenna ground plane 42. Each of the VIAs 45-1 to 45-4 may then couple to an antenna element either directly, or indirectly by way of a coaxial cable, for instance.

The plurality of control lines 46 can cause the switches of each phase shifter to open/close, and therefore, introduce phase shifts via the phase shifters 21-1 to 21-4. In particular, each control line of the switch driving circuit 40 carries a HIGH or a LOW signal to turn a given switch ON or OFF, respectively. The controller 3 may output the HIGH/LOW line driving signal(s). In response, the switches of each phase shifter open/close at each instance in time to ensure the output RF beam is "steered" in a desired manner.

Figure 5:
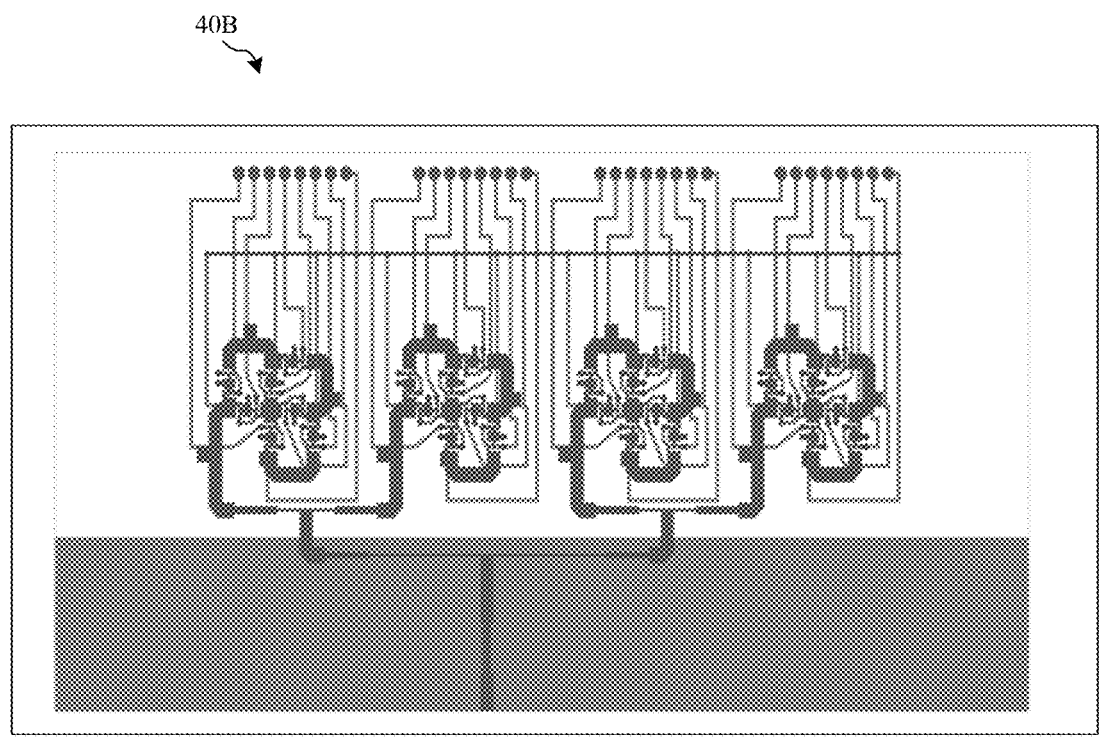
FIG. 5 shows a plurality of phase shifters transposed on to an associated driving circuit, in accordance with an embodiment of the present disclosure.

FIG. 5 is an example schematic 40B which shows the control lines 46 transposed on to the phase shifters 21-1 to 21-4 to illustrate alignment of control lines, VIAs, and switches.

Figure 6:
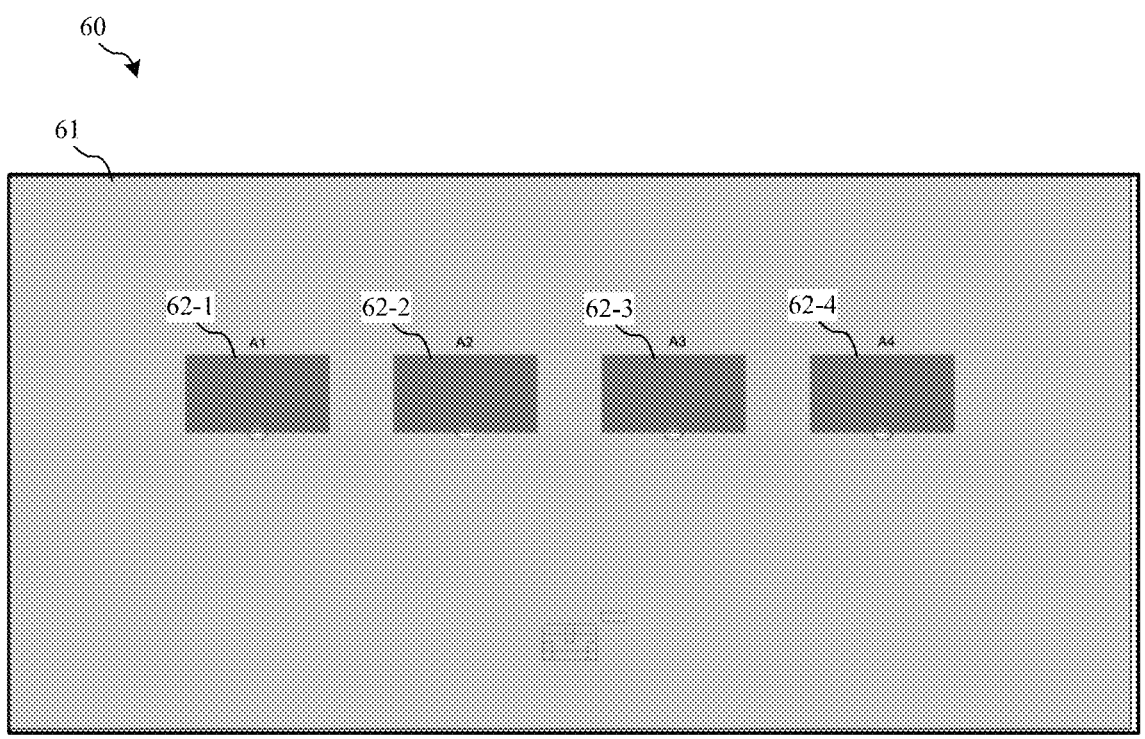
FIG. 6 shows a substrate with a plurality of antenna elements, in accordance with an embodiment of the present disclosure.

FIG. 6 shows an example antenna array 60 in accordance with an embodiment of the present disclosure. As shown, the antenna array 60 comprises a substrate 61 with a plurality of antenna elements 62-1 to 62-4 disposed thereon. The substrate may comprise, for example, a printed circuit board (PCB). Each of the antenna elements 62-1 to 62-4 may electrically couple to the phase shifters 21-1 to 21-4, respectively. The antenna array 60 may also include a ground plane (not shown) that may be disposed on one side.

Turning to FIGS. 7A-7D, one example phase shifter 21-N is shown with various delay arms/transmission paths engaged to introduce a selected phase shift. Note while specific examples reference exact phase shifts of, for example, 90, 180 and 270 degrees, such phase shifts may not necessarily manifest under real-world conditions. For instance, simulation and experimentation has shown the phase shift to be around +−3 degrees.

In one particular simulation, variations in phase shift were identified due to mutual coupling and unequal stub length. Some simulations and experiments showed that the transmission arms (31-1 to 31-4) did not provide equal phase shift. In particular, the simulation showed that the addition of microstrip line segment 31-2 introduced a phase shift of 87 degrees, addition of microstrip line segment 31-3 introduced an additional 59 degrees, and addition of microstrip line segment 31-4 introduced an additional 63 degrees of phase shift. Stated more plainly, instead of 0, 90, 180 and 270 degrees, phase shifts of 0, 87, 146 and 209 degrees were measured. Note, this variation may be compensated for by proportionally adjusting transmission arm length to provide a nominal phase shift of 90 degrees along each transmission line/arm.

FIG. 7A shows that a phase shift of about 90 degrees may be introduced by turning switches 34-1 and 34-2 to ON while keeping switches 34-3 to 34-7 OFF. FIG. 7B shows that a phase shift of about 180 degrees may be introduced by turning switches 34-1, 34-3 and 34-4 ON while keeping switches 34-2 and 34-5 to 34-7 OFF. In this example, the overall length of the RF paths is equal to the sum of the length of the microstrip line segments 31-2 and 32-3. Stated differently, each of the microstrip line segments 31-2 and 32-3 may be of equal length and designed to introduce a phase shift of 90 degrees. Thus, microstrip lines segments 31-2 and 32-3 may be switchably coupled together to introduce an overall phase shift about 180 degrees.

FIG. 7C shows that a phase shift of about 270 degrees may be introduced by turning switches 34-1, 34-3, 34-4, 34-5 and 34-6 ON while having switches 34-2, 34-4, and 34-7 OFF. In this example, the overall length of the RF path/transmission line is equal to the sum of the length of the microstrip line segments 31-2, 32-3 and 34-4. As discussed above, each microstrip line segment may be of an equal length. Thus, coupling microstrip line segments 31-2, 31-3, and 31-4 may introduce an overall phase shift of 270 degrees.

FIG. 7D shows that a phase shift of about 0 degrees may be introduced by turning switch 34-7 ON while having switches 34-1 to 34-6 OFF. Note, this configuration may also be utilized as a reference arm when switchably introducing a 90, 180, or 270 degree phase shift as discussed above.

In accordance with an aspect of the present disclosure, a phased antenna array system is disclosed. The phased antenna array system including a substrate, a phase shifter network disposed on a surface of the substrate, the phase shifter network having a plurality of phase shifters, each of the plurality of phase shifters comprising a plurality of RF line segments looped about an interconnect device, the interconnect device to couple to an antenna element, and a switching arrangement to switchably electrically couple one or more RF line segments of the plurality of RF line segments to the antenna element via the interconnect device to introduce a selected phase shift into an output RF signal.

In accordance with another aspect of the present disclosure a phase shifter circuit is disclosed. The phase shifter circuit comprising a substrate, a plurality of RF line segments disposed on a surface of the substrate in a substantially circular pattern about a common point, an interconnect device disposed on the substrate at the common point to electrically couple to the plurality of RF line segments, the interconnect device to electrically couple to an antenna device, and a switching arrangement to switchably electrically couple one or more RF line segments of the plurality of RF line segments to the antenna element via the interconnect device to introduce a selected phase shift into an output RF signal.

In accordance with another aspect of the present disclosure a method for switchably introducing a target phase shift into an RF signal. The method comprising receiving, by a phase shifter circuit, a driving signal, in response to receiving the driving signal, switchably electrically coupling at least one transmission path of a plurality of transmission paths to an antenna element to introduce the target phase shift in an RF signal, receiving, by the phase shifter circuit, an RF signal via the electrically coupled transmissions paths and transmitting the same with the target phase shift via the antenna element.

Embodiments of the methods described herein may be implemented using a processor and/or other programmable device. To that end, the methods described herein may be implemented on a tangible, computer readable storage medium having instructions stored thereon that when executed by one or more processors perform the methods. Thus, for example, the transmitter and/or receiver may include a storage medium (not shown) to store instructions (in, for example, firmware or software) to perform the operations described herein. The storage medium may include any type of non-transitory tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, "circuit" or "circuitry" may comprise, for example, singly or in any combination, hardwired circuitry, programmable circuitry, state machine circuitry, and/or firmware that stores instructions executed by programmable circuitry. In at least one embodiment, the transmitter and receiver may comprise one or more integrated circuits. An "integrated circuit" may be a digital, analog or mixed-signal semiconductor device and/or microelectronic device, such as, for example, but not limited to, a semiconductor integrated circuit chip. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. As used herein, use of the term "nominal" or "nominally" when referring to an amount means a designated or theoretical amount that may vary from the actual amount.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A phased array antenna system comprising:
   a substrate; and
   a phase shifter network disposed on a surface of the substrate, the phase shifter network having a plurality of phase shifters, each of the plurality of phase shifters comprising:
   a plurality of radio frequency (RF) line segments, each of the plurality of RF line segments configured to introduce a phase shift into an RF signal; and
   a switching arrangement to switchably electrically couple one or more RF line segments of the plurality of RF line segments to an interconnect device to introduce a target phase shift into an output RF signal, the switching arrangement comprising a plurality of switches, each one of the plurality of RF line segments being switchably coupleable to the interconnect device through a different associated first one of the plurality of switches, and each one of the plurality of RF line segments being switchably coupleable to at least one other one of the plurality of RF line segments through a second one of the plurality of switches.

2. The phased array antenna system of claim 1, wherein each RF line segment of the plurality of RF line segments has a length that is substantially the same as a length of the others of the plurality of RF line segments.

3. The phased array antenna system of claim 1, wherein each RF line segment of the plurality of RF line segments is configured to introduce a phase shift of substantially 90 degrees.

4. The phased array antenna system of claim 1, wherein each RF line segment of the plurality of RF line segments is a microstrip lines.

5. The phased array antenna system of claim 1, wherein the switching arrangement electrically couples at least three of the RF line segments of the plurality of RF line segments together to introduce a phase shift of substantially 270 degrees into the output RF signal.

6. The phased array antenna system of claim 1, wherein the interconnect device comprises a VIA.

7. The phased array antenna system of claim 1, wherein switching arrangement comprises a plurality of PIN diode switches to switchably electrically couple the plurality of RF line segments to each other.

8. The phased array antenna system of claim 1, further comprising control lines to cause the switching arrangement to electrically couple one or more RF line segments of the plurality of line segments to each other based on a driving signal.

9. The phased array antenna system of claim 8, further comprising a controller electrically coupled to the control lines, the controller configured to provide the driving signal.

10. The phased array antenna system of claim 8, further comprising a ground plane disposed on the substrate.

11. The phased array antenna system of claim 1, wherein the phase shifter network is a 1×4 array of phase shifters.

12. The phased array antenna system of claim 1, wherein the plurality of RF line segments are switchably coupleable by the switching arrangement to loop at least partially around the interconnect device.

13. The phased array antenna system of claim 1, wherein the each of the different associated first ones of the plurality of the switches extends radially outwardly from the interconnect device.

14. A phase shifter circuit comprising:
   a substrate;
   a plurality of radio frequency (RF) line segments disposed on the substrate;
   a switching arrangement comprising a plurality of switches, each one of the plurality of RF line segments being switchably coupleable to an interconnect device through a different associated first one of the plurality of switches, and each one of the plurality of RF line segments being switchably coupleable to at least one other one of the plurality of RF line segments through a second one of the plurality of switches; and
   a plurality of control lines coupled to the switching arrangement for controlling the plurality of switches to cause at least one RF line segment of the plurality of RF line segments to switchably electrically couple to the interconnect device to introduce a phase shift into an RF signal based on a length of the at least one RF line segment.

15. The phase shifter circuit of claim 14, wherein the length of the at least one RF line segment is the same as a length of the others of the plurality of RF line segments.

16. The phase shifter circuit of claim 14, wherein each of the RF line segments is configured to introduce a phase shift of substantially 90 degrees.

17. The phase shifter circuit of claim 14, wherein the plurality of RF line segments are switchably coupleable by the switching arrangement to loop at least partially around the interconnect device.

18. A phased array antenna system comprising:
   a substrate; and
   a phase shifter network disposed on a surface of the substrate, the phase shifter network having a plurality of phase shifters, each of the plurality of phase shifters comprising:
   a plurality of radio frequency (RF) line segments, each of the plurality of RF line segments configured to introduce a phase shift into an RF signal based on an associated overall length; and
   a switching arrangement to switchably electrically couple at least three of the RF line segments of the plurality of RF line segments together to introduce a phase shift of substantially 270 degrees into an output RF signal.

19. The phased array antenna system of claim 18, wherein the plurality of RF line segments are switchably coupleable by the switching arrangement to loop at least partially around the interconnect device.

20. A phased antenna array system comprising:
   a substrate; and
   a phase shifter network disposed on a surface of the substrate, the phase shifter network having a 1×4 array of phase shifters, each phase shifter of the 1×4 array of phase shifters comprising:

a plurality of radio frequency (RF) line segments, each of the plurality of RF line segments configured to introduce a phase shift into an RF signal based on an associated overall length; and a switching arrangement to switchably electrically couple one or more RF line segments of the plurality of RF line segments to an antenna element to introduce a target phase shift into an output RF signal.

* * * * *